US009618368B2

(12) United States Patent
Schlichtner

(10) Patent No.: US 9,618,368 B2
(45) Date of Patent: Apr. 11, 2017

(54) POSITION-MEASURING DEVICE

(71) Applicant: DR. JOHANNES HEIDENHAIN GmbH, Traunreut (DE)

(72) Inventor: Ludwig Schlichtner, Hochburg-Ach (AT)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 153 days.

(21) Appl. No.: 14/710,685

(22) Filed: May 13, 2015

(65) Prior Publication Data
US 2015/0330813 A1 Nov. 19, 2015

(30) Foreign Application Priority Data

May 13, 2014 (DE) .................. 10 2014 209 004

(51) Int. Cl.
*G01D 5/347* (2006.01)
*G01D 5/245* (2006.01)

(52) U.S. Cl.
CPC .................. *G01D 5/2457* (2013.01)

(58) Field of Classification Search
CPC .................................................. G01D 5/2457
USPC .................................. 33/1 PT, 706, 707, 708
See application file for complete search history.

(56) References Cited

U.S. PATENT DOCUMENTS

| 4,403,859 A * | 9/1983 | Ernst | G01D 5/2457 250/237 G |
| 4,628,609 A * | 12/1986 | Rieder | G01B 7/02 250/237 G |
| 5,010,655 A * | 4/1991 | Rieder | G01D 5/36 250/237 G |
| 7,421,800 B2 | 9/2008 | Howley | |
| 2004/0129870 A1* | 7/2004 | Strasser | G01D 5/366 250/231.13 |
| 2004/0168333 A1* | 9/2004 | Mauerberger | G01D 5/366 33/707 |
| 2007/0227438 A1* | 10/2007 | Howley | G01D 5/2451 116/323 |
| 2007/0256313 A1* | 11/2007 | McAdam | G01D 5/2451 33/706 |
| 2010/0171489 A1* | 7/2010 | Shiao | G01D 5/2457 324/207.13 |

(Continued)

FOREIGN PATENT DOCUMENTS

DE 10123539 A1 11/2002

*Primary Examiner* — G. Bradley Bennett
(74) *Attorney, Agent, or Firm* — Leydig, Voit & Mayer, Ltd.

(57) ABSTRACT

A position-measuring device includes a scale and a scanning unit movable relative to the scale in a measurement direction. The scale has an incremental measuring graduation and reference marks spaced apart from each other. The scale has a first marking track containing a first marking associated a reference mark and a second marking spaced apart from the first marking. The scanning unit has a first and a second detector spaced apart from each other. A distance between the detectors is greater than a length of the first marking and less than a length of the second marking. The scanning unit is configured to produce a reference pulse based on only the first detector of the two detectors generating a scanning signal, and to produce a switching signal when both the first detector and the second detector generate a scanning signal.

10 Claims, 4 Drawing Sheets

(56) References Cited

U.S. PATENT DOCUMENTS

| | | | |
|---|---|---|---|
| 2011/0116102 A1* | 5/2011 | Lipp | G01D 5/24442 356/614 |
| 2016/0011017 A1* | 1/2016 | Hayashi | G01D 5/34753 33/707 |
| 2016/0245673 A1* | 8/2016 | McAdam | G01D 5/34715 |

* cited by examiner

POSITION-MEASURING DEVICE

CROSS-REFERENCE TO PRIOR APPLICATION

Priority is claimed to German Patent Application No. DE 10 2014 209 004.0, filed on May 13, 2014, the entire disclosure of which is hereby incorporated by reference herein.

FIELD

The present invention relates to a position-measuring device having a scale and a scanning unit movable relative thereto in the measurement direction, where the scale has an incremental measuring graduation, as well as a plurality of reference marks spaced apart in the measurement direction.

BACKGROUND

Such position-measuring devices are used, in particular, in machine tools for measuring the position of a tool relative to a workpiece to be machined, in coordinate measuring machines for determining the position and dimensions of test objects, as well as in the semiconductor industry, for example, in wafer steppers and bonders. In such devices, the scale is directly attached to the drive unit (e.g., a linear motor), or the scale is attached to a component driven by the drive unit. The scanning unit of the position-measuring device is stationarily disposed opposite the moving scale on another machine part whose position is to be measured.

A position-measuring device of this type is known, for example, from U.S. 7,421,800 B2. The scale has an incremental measuring graduation for generating periodic measurement signals, as well as a plurality of reference marks spaced apart in the measurement direction and used for generating reference mark signals. The function of a reference mark signal is to establish an absolute reference of the incremental position measurement for the position of the reference mark by setting a counter to a predetermined counter value. In order to make this position selectable for the user, the user may select from the plurality of reference marks. For selection purposes, a first marking in a marking track of the scale is associated with the desired reference mark and generates a selection signal when scanned. Also located in this marking track is a second marking from which a switching signal defining a limit position can be produced by scanning.

In order to distinguish the two markings located at different positions in the marking track, a further marking is located at the position of the second marking in a further marking track. To increase the reliability of discrimination, it is proposed to make the second marking longer than the further marking located in the further marking track.

SUMMARY

In an embodiment, the present invention provides a position-measuring device including a scale and a scanning unit movable relative to the scale in a measurement direction. The scale has an incremental measuring graduation and a plurality of reference marks spaced apart from each other in the measurement direction. A reference mark pulse can be generated by scanning one of the reference marks. The scale has a first marking track containing a first marking associated with one of the reference marks and a second marking spaced apart from the first marking in the measurement direction. The second marking is longer than the first marking in the measurement direction. A switching signal can be generated by scanning the second marking. The scanning unit has, for purposes of scanning the first marking track, a first detector and a second detector spaced apart from the first detector in the measurement direction. A distance between the first detector and the second detector is greater than a length of the first marking and less than a length of the second marking. Each of the detectors are configured to generate a scanning signal in response to scanning one of the markings. The scanning unit is configured to produce the reference pulse based on only the first detector of the two detectors generating a scanning signal, and to produce the switching signal when both the first detector and the second detector generate a scanning signal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention further increases the reliability of discrimination between markings, and thus of the positions defining them, in a position-measuring device of the type discussed above.

In an embodiment, a position-measuring device includes a scale and a scanning unit movable relative thereto in the measurement direction. The scale has an incremental measuring graduation, as well as a plurality of reference marks spaced apart in the measurement direction. By scanning the measuring graduation, periodic measurement signals can be generated, and by scanning the reference marks, respective reference mark signals can be generated. Furthermore, the scale has a marking track containing a first marking, the first marking being associated with one of the reference marks. By scanning this first marking, a scanning signal can be generated which functions as a selection signal of the reference mark with which the first marking is associated.

The marking track contains a second marking which is spaced apart from the first marking in the measurement direction and is longer than the first marking in the measurement direction. By scanning this second marking, a switching signal can be generated.

For purposes of scanning the marking track, the scanning unit has a first detector and a second detector spaced apart therefrom in the measurement direction, the distance between the two detectors being greater than the length of the first marking and less than the length of the second marking. Each of the detectors generates a scanning signal in response to scanning one of the markings.

The scanning unit is designed to generate the switching signal when both the first and second detectors concurrently generate a scanning signal. The scanning unit is further designed to produce a reference pulse when only the first of the two detectors generates a scanning signal.

The formulation that a reference mark "is selectable" does not necessarily mean that only one reference mark is selected in accordance with all embodiments of the invention. For example, there may also be suitable applications for embodiments of the invention, where a plurality of reference marks are selected by associating a first marking with each of this plurality of reference marks.

Figure 1:
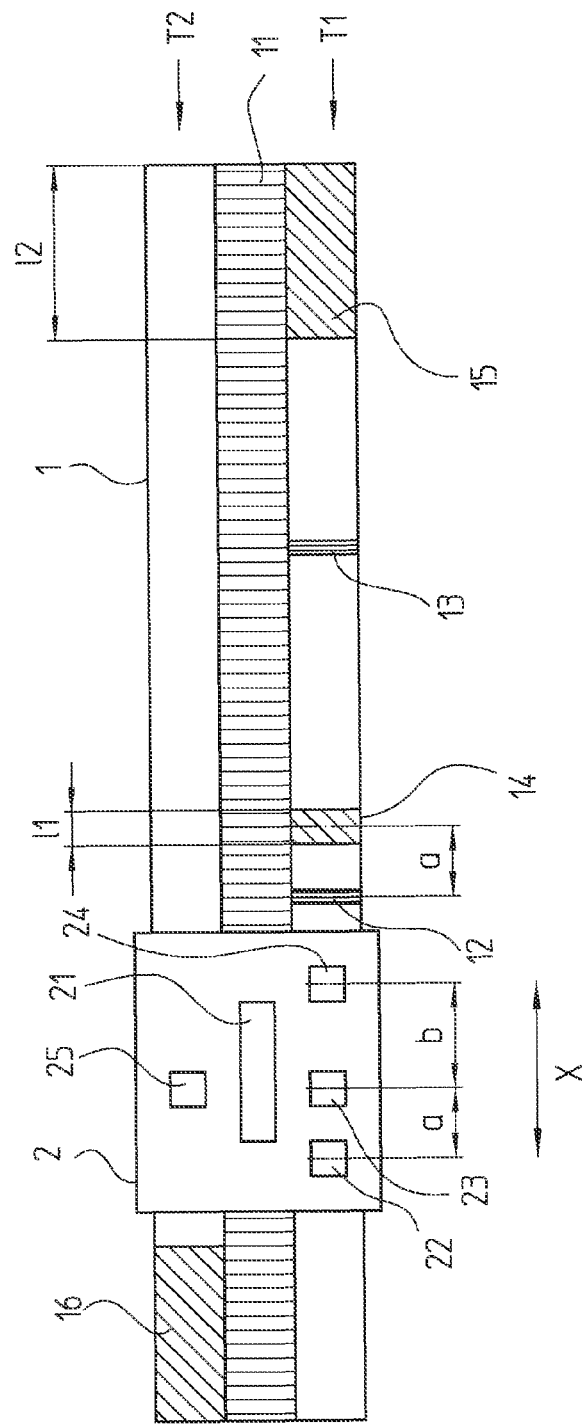
FIG. 1 is a schematic view of a first exemplary embodiment of the position-measuring device according to the present invention.
Figure 2:
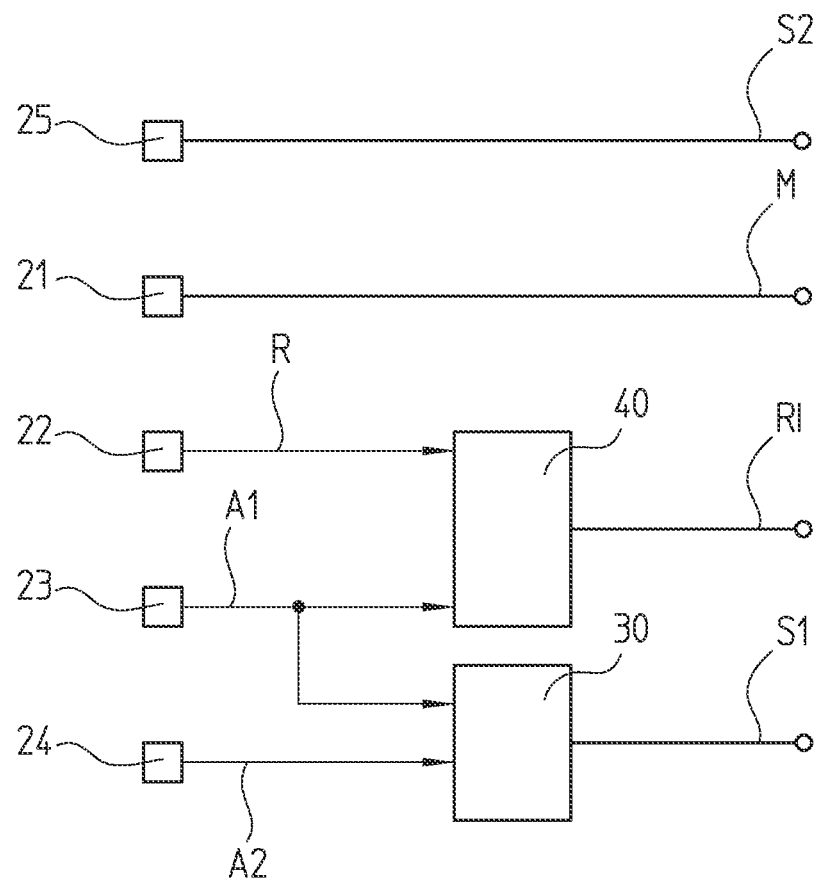
FIG. 2 shows an evaluation circuit of the position-measuring device of FIG. 1.

A first exemplary embodiment of the position-measuring device according to the present invention is shown in FIGS. 1 and 2, and will be described in detail hereinafter.

The position-measuring device includes a scale 1 and a scanning unit 2 movable relative thereto in measurement direction X. Scale 1 carries an incremental measuring graduation 11, which can be scanned by a detector unit 21 of scanning unit 2. During the scanning of measuring graduation 11, detector unit 21 produces, in known manner, electrical periodic measurement signals M which allow for relative position measurement.

Scale 1 further has a plurality of reference marks 12, 13 spaced apart in measurement direction X. For purposes of scanning reference marks 12, 13, a reference mark detector 22 is provided in scanning unit 2. When reference marks 12, 13 are scanned by reference mark detector 22, a reference mark signals R is produced in each case.

A reference mark may be selected from the plurality of reference marks 12, 13. For the purpose of selecting one of reference marks 12, 13, a marking track T1 is provided on scale 1. In this marking track T1, a first marking 14 is associated with the selected reference mark 12. For purposes of scanning first marking 14, a first detector 23 is provided in scanning unit 2. When this first marking 14 is scanned by first detector 23, a selection signal is produced in the form of a first scanning signal A1. If reference mark signal R and first scanning signal A1 occur simultaneously in scanning unit 2, a reference mark pulse RI is produced which associates this position with an absolute position. This may be accomplished, for example, by setting a counter of the incremental position measurement to a predetermined value. The principle of the logic for producing a reference mark pulse RI at the position of the reference mark 12 selected by means of first marking 14 is schematically shown in FIG. 2 by component 40 of scanning unit 2.

First marking 14 is in particular one which may be applied to scale 1 by the user of the position-measuring device, for example, by adhesive bonding or screwing. If the position-measuring device operates according to the photoelectric scanning principle, first marking 14 is preferably an opaque or non-reflective strip, and the remaining region of marking track T1 is designed to be complementary thereto; i.e., to be transparent or reflective.

In order to ensure that reference mark signal R and first scanning signal A1 can be produced simultaneously, first marking 14 is applied at a distance a from reference mark 12. This distance a corresponds to the distance a between reference mark detector 22 and first detector 23 (distances a and b are each in measurement direction X).

Reference marks 12, 13 may also be integrated within measuring graduation 11, as is generally known and illustrated, for example, in U.S. Pat. No. 7,421, 800 B2 mentioned at the outset. In this case, distance a can be selected to be zero.

In many cases, an additional requirement for position measurement is that an as reliable a switching signal as possible be output at a predetermined region of scale 1. This switching signal may be used, for example, to positively detect whether scanning unit 2 is located at an end position of the scale or whether the scanning unit is located on the right or left side of a reference mark.

In the first exemplary embodiment, the intention is to generate a switching signal S1 which indicates an end position of scale 1. To be able to generate such a switching signal S1 by scanning scale 1 with scanning unit 2, a second marking 15 is located in marking track T1 at a distance from first marking 14 in measurement direction X. This second marking 15 has a length l2 in measurement direction X, with l2 being greater than length l1 of first marking 14.

For purposes of scanning marking track T1, scanning unit 2 has the first detector 23 and a second detector 24 spaced apart therefrom in measurement direction X, the distance b between the two detectors 23 and 24 being greater than length l1 of first marking 14 and less than length l2 of second marking 15. Since marking track T1 is scanned by first detector 23 and by second detector 24, first detector 23 produces a scanning signal A1 in response to scanning first marking 14 and in response to scanning second marking 15, respectively, and second detector 24 produces a scanning signal A2 in response to scanning first marking 14 and in response to scanning second marking 15, respectively.

Scanning unit 2 is designed to generate switching signal S1 when first detector 23 generates first switching signal A1 and second detector 24 simultaneously generates second scanning signal A2. In FIG. 2 there is schematically shown an evaluation unit 30 for generating switching signal Si. Since second marking 15 is longer than distance b between first detector 23 and second detector 24, and because first marking 14 is shorter than this distance b, it is ensured that switching signal S1 is produced only at second marking 15. In order to further ensure that switching signal S1 is not produced in response to scanning first marking 14 and reference mark 12, distance b between first detector 23 and second detector 24 differs from distance a between reference mark 12 and first marking 14.

It is advantageous if first detector 23 is located on that side of the two detectors 23 and 24 on which first marking 14 is also located with respect to second marking 15 in marking track T1. This ensures that when scanning unit 2 enters second marking 15, second detector 24 will always generate scanning signal A2 first before first detector 23 enters second marking 15. This embodiment ensures that when second marking 15 is scanned, no reference mark pulse RI will inadvertently be generated, because, in any case, second scanning signal A2 will be generated first and block the output of a reference mark pulse RI. Thus, scanning unit 2 is designed to produce reference pulse RI solely when only first detector 23 of the two detectors 23, 24 generates a scanning signal A1.

In the first exemplary embodiment, second marking 15 is advantageously located at a limit position of scale 1, and switching signal S1 indicates this limit position (here the right end position) for the travel path of scanning unit 2.

Scale 1 of the first exemplary embodiment has a further marking track T2 which, like first marking track T1, extends adjacent to measuring graduation 11 and parallel thereto in measurement direction X. In this further marking track T2, there is located a further marking 16. Scanning unit 2 has a further detector 25 for scanning this further marking track T2. This further detector 25 generates a further switching signal S2 in response to scanning the further marking 16. In the example shown, the further marking 16 is located at the left limit position of scale 1, so that the further switching signal S2 indicates the left end position for scanning unit 2.

Figure 3:
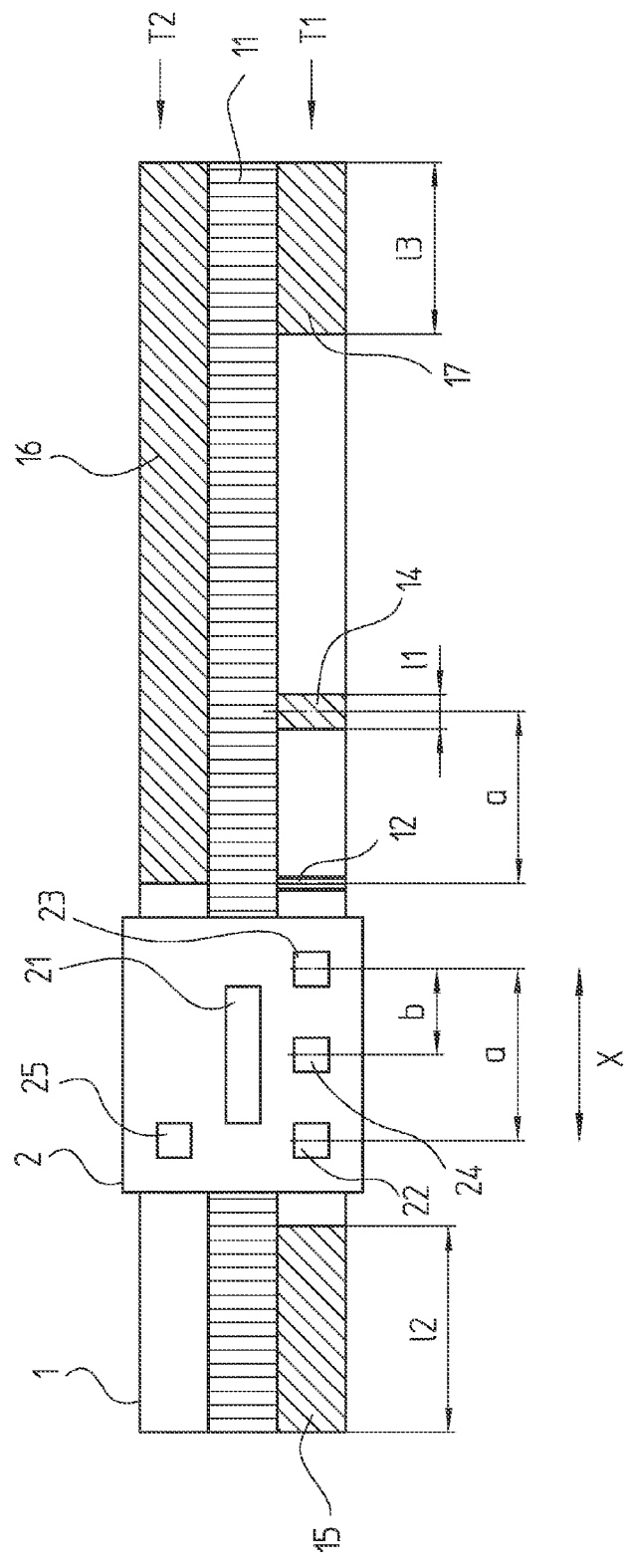
FIG. 3 is a schematic view of a second exemplary embodiment of the position-measuring device according to the present invention.
Figure 4:
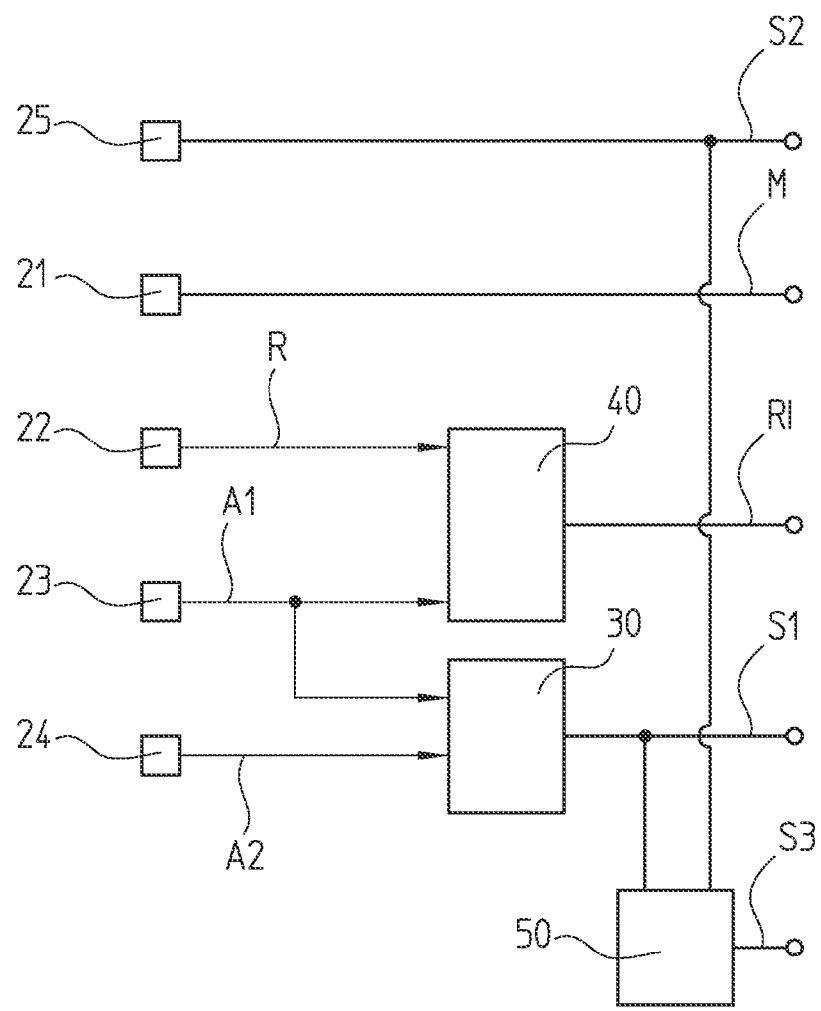
FIG. 4 shows an evaluation circuit of the position-measuring device of FIG. 3.

In the following, another position-measuring device designed in accordance with the an embodiment of the present invention will be described with reference to FIGS. 3 and 4, in which functionally equivalent parts are identified by the same reference numerals as in the first exemplary embodiment.

This position-measuring device again includes a scale 1 and a scanning unit 2 movable relative thereto in measurement direction X. Scale 1 carries an incremental measuring graduation 11, which can be scanned by a detector unit 21 of scanning unit 2. During the scanning of measuring graduation 11, detector unit 21 produces electrical periodic measurement signals M which allow for relative position measurement.

Scale 1 further has a plurality of reference marks 12 spaced apart in measurement direction X, only one of which is shown here for the sake of clarity. For purposes of scanning reference marks 12, a reference mark detector 22 is provided in scanning unit 2. When reference marks 12 are scanned by reference mark detector 22, a reference mark signals R is produced in each case.

A reference mark may be selected from the plurality of reference marks 12. For the purpose of selecting, for example, reference mark 12, a marking track T1 is provided on scale 1. In this marking track T1, a first marking 14 is associated with this selected reference mark 12. For purposes of scanning first marking 14, a first detector 23 is provided in scanning unit 2. When this first marking 14 is scanned by first detector 23, a selection signal is produced in the form of a first scanning signal A1. If reference mark signal R and first scanning signal A1 occur simultaneously in scanning unit 2, a reference mark pulse RI is produced which associates this position with an absolute position by setting a counter of the incremental position measurement to a predetermined value. The principle of producing a reference mark pulse RI at the position of the reference mark 12 selected by means of first marking 14 is schematically shown in FIG. 2 by component 40 of scanning unit 2.

In order to ensure that reference mark signal R and first scanning signal A1 can be produced simultaneously at the desired position, first marking 14 is applied at a distance a from reference mark 12. This distance a corresponds to the distance a between reference mark detector 22 and first detector 23.

Reference marks 12 may also be integrated within measuring graduation 11, as is generally known and illustrated, for example, in U.S. Pat. No. 7,421,800 B2 mentioned at the outset. In this case, distance a can also be selected to be zero.

To be able in this exemplary embodiment, too, to additionally generate a switching signal S1 by scanning scale 1 with scanning unit 2, a second marking 15 is located in marking track T1 at a distance from first marking 14 in measurement direction X. This second marking 15 is longer than first marking 14 in measurement direction X.

For purposes of scanning marking track T1, scanning unit 2 has the first detector 23 and a second detector 24 spaced apart therefrom in measurement direction X, the distance b between the two detectors 23 and 24 being greater than length 11 of first marking 14 and less than length 12 of second marking 15. Since marking track T1 is scanned by first detector 23 and by second detector 24, first detector 23 produces a scanning signal A1 in response to scanning first marking 14 and in response to scanning second marking 15, respectively, and second detector 24 produces a scanning signal A2 in response to scanning first marking 14 and in response to scanning second marking 15, respectively.

Scanning unit 2 includes an evaluation unit 30, which is designed to generate switching signal S1 when first detector 23 generates first switching signal A1 and second detector 24 simultaneously generates second scanning signal A2. Since second marking 15 is longer than distance b between first detector 23 and second detector 24, and because first marking 14 is shorter than this distance b, it is ensured that switching signal S1 is produced only at second marking 15 and not at first marking 14. In order to further ensure that switching signal S1 is not produced in response to scanning first marking 14 and reference mark 12, distance b between first detector 23 and second detector 24 differs from distance a between reference mark 12 and first marking 14.

It is advantageous if first detector 23 is located on that side of the two detectors 23 and 24 on which first marking 14 is also located with respect to second marking 15 in marking track T1. This ensures that when scanning unit 2 enters second marking 15, second detector 24 will always generate scanning signal A2 first before first detector 23 enters second marking 15. This embodiment ensures that when second marking 15 is scanned, no reference mark pulse RI will inadvertently be generated. Thus, scanning unit 2 is designed to produce reference pulse RI solely when only first detector 23 of the two detectors 23, 24 generates a scanning signal A1.

In this second exemplary embodiment, second marking 15 is again advantageously located at a limit position of scale 1, and switching signal Si indicates this limit position, which here is the left end position for the travel path of scanning unit 2.

Scale 1 of the second exemplary embodiment has a further marking track T2 extending parallel to first marking track T1 in measurement direction X. In this further marking track T2, there is located a further marking 16. Scanning unit 2 has a further detector 25 for scanning this further marking track T2. This further detector 25 generates a further switching signal S2 in response to scanning further marking 16. In the example shown, the further marking 16 is located on the right side of reference mark 12, so that the further switching signal S2 indicates the region to the right of reference mark 12.

If in the second exemplary embodiment, it should, in addition, be necessary to be able to distinguish also between the right and left end positions, a further information item may be obtained for this purpose in a simple and reliable manner. In particular, a further marking 17 is provided in first marking track T1 at the right limit position of scale 1. Length 13 of this further marking 17 in measurement direction X is greater than length 11 of first marking 14 in this marking track T1. A switching signal S3 defining the right end position is produced when detector 25 produces a scanning signal S2 and, at the same time, the two detectors 23 and 24 produce a scanning signal A1 and A2. The logic for producing switching signal S3 is schematically shown in FIG. 4 as a component 50.

The present invention has been described using the example of the particularly advantageous photoelectric scanning principle; however, it is not limited thereto and may also be successfully implemented with inductive, magnetic or capacitive scanning principles.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position-measuring device, comprising:
   a scale having an incremental measuring graduation and a plurality of reference marks spaced apart from each other in a measurement direction, a reference mark pulse being generatable by scanning one of the reference marks, the scale having a first marking track containing a first marking associated with one of the reference marks and a second marking spaced apart from the first marking in the measurement direction, the second marking being longer than the first marking in the measurement direction, a switching signal being generatable by scanning the second marking; and
   a scanning unit movable relative to the scale in the measurement direction, the scanning unit having, for purposes of scanning the first marking track, a first detector and a second detector spaced apart from the first detector in the measurement direction, a distance between the first detector and the second detector being greater than a length of the first marking and less than a length of the second marking, each of the detectors being configured to generate a scanning signal in response to scanning one of the markings, the scanning unit being configured to produce the reference pulse based on only the first detector of the two detectors generating a scanning signal, and to produce the switching signal when both the first detector and the second detector generate a scanning signal.

2. The position-measuring device as recited in claim 1, wherein the first detector is located on a side of the two detectors on which the first marking is located with respect to the second marking.

3. The position-measuring device as recited in claim 1, further comprising a reference mark detector for generating reference mark signals, the reference mark detector being disposed in the scanning unit and being configured to scan the plurality of reference marks, the plurality of reference marks being located in the first marking track.

4. The position-measuring device as recited in claim 3, wherein the reference mark detector is located a first distance from the first detector in the measurement direction, and the first marking is located the first distance from the associated reference mark.

5. The position-measuring device as recited in claim 4, wherein the second detector is located a second distance from the first detector in the measurement direction, the second distance being different from the first distance.

6. The position-measuring device as recited in claim 1, wherein the second marking is located at a limit position of the scale, the limit position of the scale being indicated by the switching signal.

7. The position-measuring device as recited in claim 1, wherein the scale has a further marking track containing a further marking, and the scanning unit includes a further detector configured to scan the further marking.

8. The position-measuring device as recited in claim 7, wherein the scanning unit is configured to produce a further switching signal when the further detector scans the further marking.

9. The position-measuring device as recited in claim 1, wherein the detectors are light-sensitive detectors, the first marking track is reflective, and the markings are light-absorbing.

10. The position-measuring device as recited in claim 9, wherein the light-absorbing markings are strips that are adhesively bonded to the scale.

* * * * *